US010409375B1

(12) United States Patent
Higgins et al.

(10) Patent No.: US 10,409,375 B1
(45) Date of Patent: Sep. 10, 2019

(54) APPARATUS, SYSTEM, AND METHOD FOR PROVIDING LOCALIZED TACTILE FEEDBACK

(71) Applicant: FACEBOOK TECHNOLOGIES, LLC, Menlo Park, CA (US)

(72) Inventors: Jason Andrew Higgins, Seattle, WA (US); Khaled Boulos, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 140 days.

(21) Appl. No.: 15/644,680

(22) Filed: Jul. 7, 2017

(51) Int. Cl.
*A63F 13/24* (2014.01)
*G06F 3/01* (2006.01)
*G06F 3/0346* (2013.01)

(52) U.S. Cl.
CPC .............. *G06F 3/016* (2013.01); *G06F 3/014* (2013.01); *G06F 3/0346* (2013.01)

(58) Field of Classification Search
CPC . G06F 3/01; G06F 3/038; G06F 3/016; G06F 3/011; G06F 3/014
See application file for complete search history.

(56) References Cited

U.S. PATENT DOCUMENTS

| | | | |
|---|---|---|---|
| 2004/0174337 A1* | 9/2004 | Kubota | G06F 3/014 345/156 |
| 2009/0036212 A1* | 2/2009 | Provancher | G06F 3/016 463/37 |
| 2016/0313798 A1* | 10/2016 | Connor | G06F 3/017 |
| 2016/0317383 A1* | 11/2016 | Stanfield | A61H 9/0078 |
| 2017/0228019 A1* | 8/2017 | Kim | G06F 3/016 |

* cited by examiner

*Primary Examiner* — Michael A Faragalla
(74) *Attorney, Agent, or Firm* — FisherBroyles, LLP

(57) ABSTRACT

The disclosed apparatus may include a support structure that holds a portion of the apparatus in physical contact with a user's fingertip, a feedback mechanism that provides tactile feedback to the user's fingertip, a position tracking element that facilitates tracking the position of the user's fingertip, and a communication component that facilitates communication between the apparatus and a control device. Various other apparatuses, systems, and methods are also disclosed.

15 Claims, 13 Drawing Sheets

APPARATUS, SYSTEM, AND METHOD FOR PROVIDING LOCALIZED TACTILE FEEDBACK

BACKGROUND

Virtual reality systems generally track users' motions through the virtual world to provide realistic simulations of an environment. Some virtual reality systems include controllers that vibrate, change shape, or otherwise provide a physical response to users when they interact with a virtual object.

Traditional controllers are often hand-held devices. Unfortunately, holding a controller may interfere with a fully immersive virtual reality experience, as users may not able to interact with virtual objects as they would real world objects. For example, a user may be unable to poke a virtual button with a controller in the same way they would poke a button on a vending machine, as such an action (a) may not be trackable by the virtual reality system and/or (b) may move the user's finger out of physical contact with the controller, thereby rendering the system unable to provide physical sensory feedback to the user's fingertip. The instant disclosure, therefore, identifies and addresses a need for improved apparatuses, systems, and methods for providing localized tactile feedback.

SUMMARY

As will be described in greater detail below, the instant disclosure generally relates to apparatuses, systems, and methods for providing localized tactile feedback. In one example, an apparatus for accomplishing such a task may include a support structure that permits a user's fingertip to move freely in three-dimensional space while holding at least a portion of the apparatus in physical contact with the user's fingertip. The apparatus may also include at least one feedback mechanism, coupled to the support structure, that provides tactile feedback to the user's fingertip through the portion of the apparatus that is in physical contact with the user's fingertip. The apparatus may further include at least one position tracking element that facilitates tracking the position of the user's fingertip in three-dimensional space. Additionally, the apparatus may include a communication component that facilitates communication between the apparatus and a control device that determines, based on the position of the user's fingertip in three-dimensional space, when to trigger the feedback mechanism.

The feedback mechanism may include one or more of a variety of devices and systems. In some embodiments, the feedback mechanism may include a vibrational feedback mechanism. Additionally or alternatively, the feedback mechanism may include a transcutaneous electrical nerve stimulation feedback mechanism.

Moreover, the position tracking element may take a variety of forms. For example, the position tracking element may include a passive tracking element that enables the control device to track, by an additional tracking system that provides the control device with tracking information describing the position of the user's fingertip in three-dimensional space, the position of the user's fingertip in three-dimensional space. Additionally or alternatively, the position tracking element may include an active tracking mechanism that generates position tracking data based on the movement of the user's fingertip through three-dimensional space and provides the position tracking data to the control device.

The support structure may also take a variety of forms. In some embodiments, the support structure may include a glove that fits over at least two of the user's fingertips.

The communication component may communicate with the control device in a variety of ways. In some examples, the communication component may include a wireless communication device. In further examples, the communication component may include a physical connection to the control device.

The described apparatus may include any of a variety of components. For example, the apparatus may include an internal power supply that is coupled to the feedback mechanism and the communication component. The internal power supply may serve as a source of electrical power to these components. Additionally or alternatively, the apparatus may include at least one capacitive pressure sensor that enables the control device to determine when the user's fingertip has come into contact with a physical surface.

Similarly, a system incorporating the above-described apparatus may include a group of tactile feedback devices as described above in communication with a control device that communicates with each tactile feedback device and determines, based on the position of each individual tactile feedback device in three-dimensional space, when to trigger the feedback mechanism of each tactile feedback device.

In such a system, each tactile feedback device may be mechanically coupled to at least one other tactile feedback device such that the pair of tactile feedback devices is able to move about a central joint. This central joint may include a ball-and-socket joint. Furthermore, the joint may optionally include joint position sensors that provide joint position data describing the position of the central joint to the control device. Moreover, the central joint may include a force feedback mechanism that is able to dynamically adjust the flexibility of the central joint based on instructions received from the control device. Additionally or alternatively, the central joint may include at least one positioning adjustment device that is able to mechanically adjust the position of the central joint.

The system may include a support structure to ensure that the tactile feedback devices are held in the correct position on a user's hand. For example, the system may include a glove that fits over the user's hand and holds each tactile feedback device in the system in contact with a corresponding fingertip on the user's hand.

In some embodiments, the control device may maintain information to ensure that the control device triggers the correct tactile feedback device at the appropriate time. For example, the control device may register each tactile feedback device in the group of tactile feedback devices to a corresponding fingertip on the user's hand.

A corresponding method may include (i) tracking the position in three-dimensional space of a tactile feedback device, the tactile feedback device being held in physical contact with a user's fingertip and comprising a position tracking element, (ii) determining that the position of the position tracking element in three-dimensional space corresponds to a position representing an interaction of the user's fingertip with a virtual object, and (iii) in response to the determination, causing the tactile feedback device to provide tactile feedback to the user's fingertip.

The method may also include tracking, in three-dimensional space, the position of at least one additional tactile feedback device, the additional tactile feedback device being held in physical contact with an additional fingertip and comprising an additional position tracking element. In this example, the method may further include causing the additional tactile feedback device to provide tactile feedback to the additional fingertip in response to determining that the position of the additional position tracking element corresponds to a position representing an interaction of the additional fingertip with the virtual object.

In some examples, the method may include adjusting various aspects of the tactile feedback provided through the tactile feedback device based on the nature of the user's fingertip with the virtual object. For example, the method may include adjusting the pattern of the tactile feedback provided to the user's fingertip, the type of tactile feedback provided to the user's fingertip, and/or the intensity of the tactile feedback provided to the user's fingertip.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
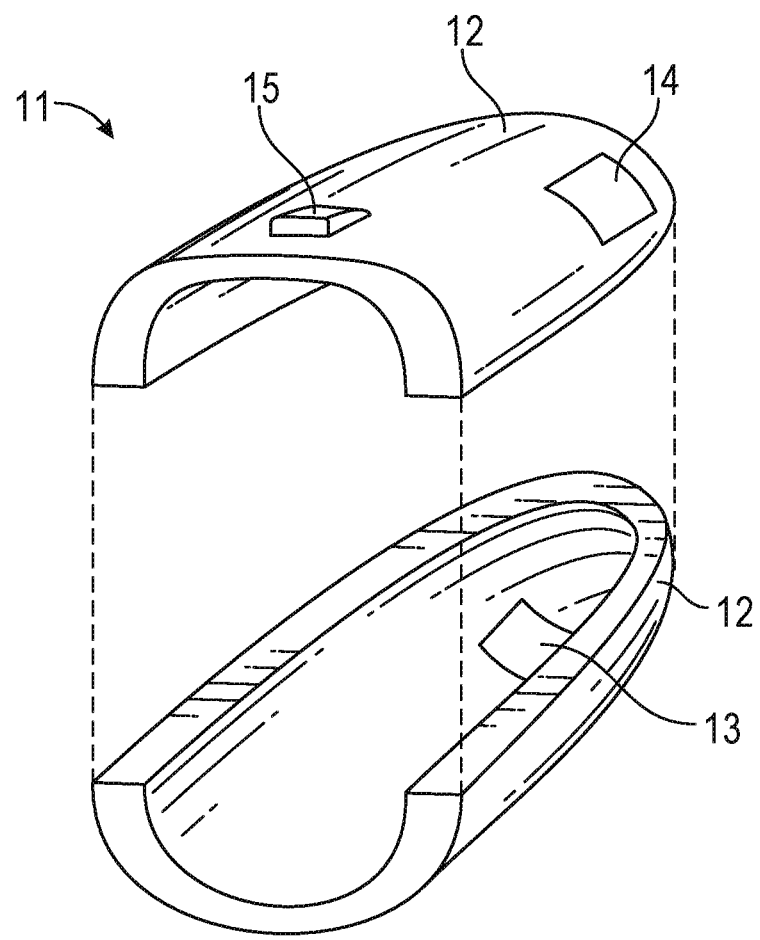
FIG. 1 is a cutaway diagram of an example apparatus for providing localized tactile feedback.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for providing localized tactile feedback. As will be described below, embodiments of the instant disclosure may operate as part of a virtual reality system to provide users with tactile feedback directly to their fingertips when they interact with a virtual object. The form of the apparatus may hold feedback mechanisms in contact with the user's fingertip while simultaneously allowing the user to move their hand and fingers freely through space. For example, the systems and methods described herein may provide granular levels of tactile feedback to a user without requiring the user to grasp a controller or other bulky device that may interfere with immersion in the virtual environment. The apparatuses and systems disclosed herein may also enable various virtual reality control systems to accurately track the location of the user's fingertips so that tactile feedback may be provided when appropriate.

The following will provide, with reference to FIGS. 1-12, examples of an apparatus for providing localized tactile feedback in addition to examples of how a user might wear and/or use such an apparatus. Finally, the discussion corresponding to FIG. 13 will provide examples of methods for utilizing such an apparatus to provide appropriate tactile feedback when a user interacts with a virtual object.

FIG. 1 is a breakaway diagram showing an example embodiment of an apparatus 11 that provides localized tactile feedback to a user's fingertip. As shown in the example of FIG. 1, a support structure 12 may enclose a space that fits the user's fingertip, thereby holding a portion of apparatus 11 in physical contact with the user's fingertip while simultaneously permitting the user's fingertip to move freely in three-dimensional space. As will be described in greater detail below, support structure 12 may take a variety of forms, such as the thimble-shaped apparatus illustrated in FIG. 1, the ring-like structure illustrated in FIG. 2, a stick-on pad that adheres to the user's fingertip, a full hand glove, a partial hand glove, a finger glove, and/or any other suitable shape for holding at least a portion of apparatus 11 in physical contact with a user's fingertip. Likewise, support structure 12 may be composed of any suitable material or combination of materials, such as plastics, resins, elastics, woven fabrics, laminates, etc.

Support structure 12 may include a variety of other material features to assist in holding a portion of apparatus 11 in physical contact with the user's fingertip. For example, support structure 12 may incorporate adhesive portions on the interior surface of support structure 12 that adhere to the user's skin, thereby holding support structure 12 in an appropriate position for providing tactile feedback to the user's fingertip.

The various components of support structure 12 may be joined together in a variety of ways. For example, components of support structure 12 may be joined by screws, adhesives, pins, or other physical fasteners. In some examples, components of support structure 12 may be held together by magnets embedded within each component. Additionally or alternatively, components of support structure 12 may be cast, cut out of a sheet of a material, extruded, or produced according to any suitable manufacturing method for producing the desired shape.

Support structure 12 may be physically coupled to a tactile feedback mechanism 13 that provides tactile feedback to the user's fingertip through the portion of apparatus 11 that is held in contact with the user's fingertip. In the example of FIG. 1, tactile feedback mechanism 13 is embedded within and enclosed by support structure 12. In other embodiments, tactile feedback mechanism 13 may be coupled to an interior surface of support structure 12 and may be held in direct contact with the user's fingertip. Similarly, tactile feedback mechanism 13 may be partially enclosed by support structure 12, with portions of tactile feedback mechanism 13 held in direct contact with the user's fingertip.

Tactile feedback mechanism 13 may provide tactile feedback to the user's fingertip in a variety of ways. In some embodiments, tactile feedback mechanism 13 may include a vibrational feedback mechanism. In these embodiments, the vibrational feedback mechanism may cause all or a portion of apparatus 11 to vibrate when appropriate. For example, tactile feedback mechanism 13 may cause apparatus 11 to vibrate in response to the user interacting with a virtual object, such as by touching a virtual button. Additionally or alternatively, tactile feedback mechanism 13 may include a transcutaneous electrical nerve stimulation feedback mechanism. In these embodiments, the electrical nerve stimulation feedback mechanism may include conductive pads or electrodes that are held in direct contact with the user's fingertip by support structure 12. The electrical nerve stimulation feedback mechanism may then apply an electrical current to the user's fingertip when appropriate, such as when the user interacts with a virtual object.

Furthermore, while tactile feedback mechanism 13 is illustrated as a singular component in the examples described herein, tactile feedback mechanism 13 may include more than one element, with each element positioned within apparatus 11 in a suitable arrangement that permits each element of tactile feedback mechanism 13 to provide tactile stimulus to a user's fingertip. For example, tactile feedback mechanism 13 may include both a vibrational feedback mechanism in addition to a transcutaneous electrical nerve stimulation mechanism. These mechanisms may be triggered at various times and in various ways depending on the nature of the user's interaction with a virtual object, as will be described in greater detail below.

Apparatus 11 may further include a position tracking element 14 that facilitates tracking the position of the user's fingertip in three-dimensional space. Position tracking element 14 may incorporate a variety of elements and/or take a variety of forms. In some embodiments, position tracking element 14 may include an active tracking mechanism that generates position tracking data based on the movement of the user's fingertip through three-dimensional space and provides the position tracking data to a control device. For example, position tracking element 14 may measure its position and/or movement relative to a beacon with a known and/or fixed location. Additionally or alternatively, position tracking element 14 may measure the acceleration of apparatus 11 across multiple axes. As a specific example, position tracking element 14 may include an inertial measurement unit (IMU).

The control device may represent any suitable device that is capable of determining when to activate the tactile feedback elements of apparatus 11. For example, the control device may be a personal computer running software capable of controlling apparatus 11. Additionally or alternatively, the control device may be a game console capable of performing the same. Additional examples of a control device include a mobile device, such as a phone, an integrated system (e.g., a control system may be integrated into a headset), and/or any other computing device capable of controlling physical feedback presented to a user as part of a virtual reality environment. In some examples, and as will be described further below, apparatus 11 may communicate with the control device either directly and/or through an intermediary device.

In further embodiments, position tracking element 14 may include a passive tracking element that does not directly measure the position, movement, or acceleration of apparatus 11. Such a passive tracking element may enable other devices to more easily track the location, movement, etc. of apparatus 11, and, by association, the location, movement, etc. of the user's fingertip. In these embodiments, these other devices may provide a control device for apparatus 11 with tracking information that describes the position of the user's fingertip in three-dimensional space. For example, a passive tracking element may include an infrared beacon that may be attached to apparatus 11 and that can be observed by a specialized camera, camera array, or other suitable detection device. The camera, camera array, and/or detection device may then report the position, movement, etc. of apparatus 11 to the control device. Similarly, a passive tracking element may include a high-contrast, reflective, or otherwise distinctive pattern or color on the exterior of support structure 12, such as stripes, bars, dots, combinations of one or more of the same, or any other suitable element that may be observed by devices (e.g., cameras) that track the movement and/or location of apparatus 11.

Apparatus 11 may include a communication component 15 that facilitates communication between apparatus 11 and a control device that determines when to trigger tactile feedback mechanism 13. In some examples, communication component 15 may include a wireless communication device. In these examples, communication component may use a variety of techniques to communicate wirelessly with the control device. For example, communication component 15 may use radio and/or infrared signals to communicate with the control device. Communication component 15 may facilitate wireless communications with the control device according to any suitable protocol, such as BLUETOOTH, the 802.11 networking standards, proprietary communication protocols, and/or any other suitable wireless communication protocol.

In addition to or instead of using wireless communications, communication component 15 may include a physical connection to another device, such as a control device. For example, communication component 15 may physically connect apparatus 11 to a game console. In further embodiments, communication component 15 may include a physical connection to an intermediary device that communicates directly with the control device. For example, communication component 15 may physically connect apparatus 11 to a handheld console controller that communicates with a game console.

Figure 2:
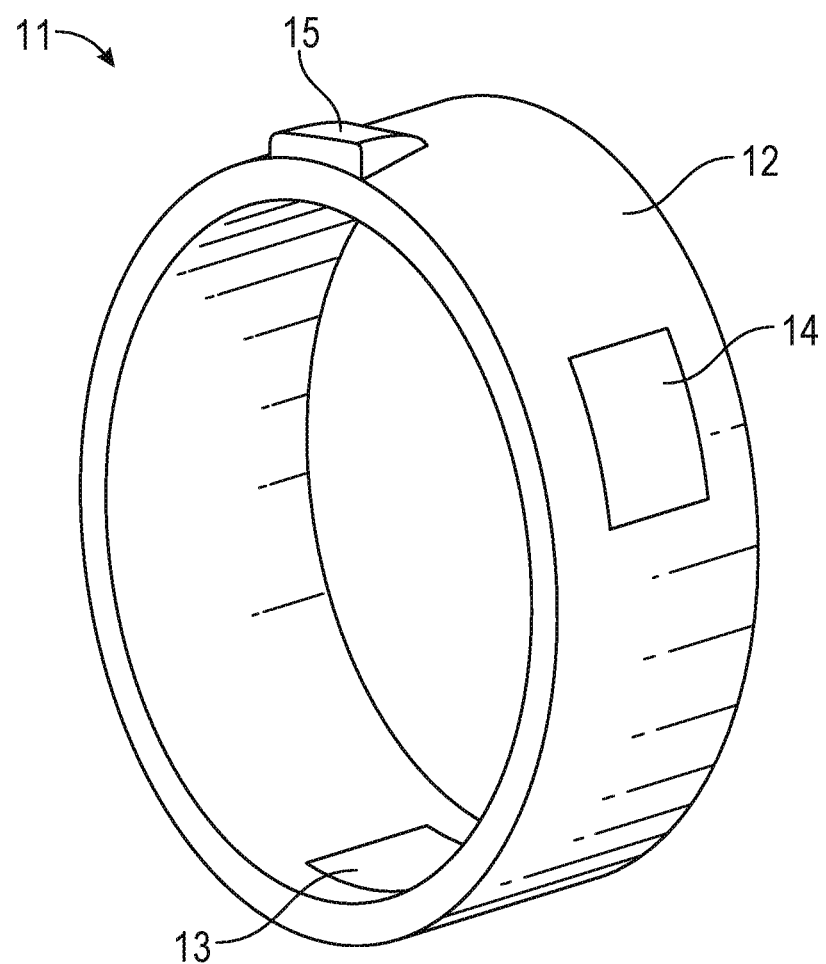
FIG. 2 is a schematic diagram of an alternative example apparatus for providing localized tactile feedback.

As described briefly above, apparatus 11 may take a variety of shapes and/or forms, such as the thimble-shaped device illustrated in FIG. 1. Apparatus 11 may also be substantially ring-shaped, as illustrated in the example of FIG. 2. In this example, the ring shape of support structure 12 may fit over a user's fingertip, thereby holding tactile feedback mechanism 13 in contact with the user's fingertip. Communication component 15 may protrude from an exterior surface of the ring, as illustrated in FIG. 2, or may be completely embedded within support structure 12. Support structure 12 may also support position tracking element 14 either on an exterior surface of support structure 12 or embedded within support structure 12.

Figure 3:
FIG. 3 is a schematic diagram of how a user might wear the example apparatus of FIG. 1.

As described above, apparatus 11 may fit over a user's finger. FIG. 3 is a diagram illustrating an example of how a user may wear apparatus 11. In this example, apparatus 11 is shaped like a thimble that fits over and covers the user's finger. In this configuration, passive tracking elements may be visible to cameras or other sensors that track the position of those elements to determine the physical location of the user's fingertip. Furthermore, tactile feedback elements incorporated within apparatus 11 may continue to be able to provide tactile feedback to the user's fingertip even if the user should extend their index finger to, for example, poke a virtual button. Although FIG. 1 illustrates apparatus 11 as thimble-shaped, other configurations of apparatus 11 may be worn by users in a similar manner. For example, the ring-shaped configuration of apparatus 11 illustrated in FIG. 2 may fit over a user's fingertip.

While apparatus 11 may formed to fit over a user's finger in the manner shown in FIG. 3, apparatus 11 may also be configured in a variety of other ways. For example, apparatus 11 may include, or be formed as, an adhesive pad that adheres directly to a user's fingertip. Additionally or alternatively, support structure 12 of apparatus 11 may cover more than just the user's fingertip. For example, various shapes, types, and forms of gloves may fit over the user's hand and hold portions of apparatus 11 in contact with the user's fingertip. Several of these embodiments will be described in greater detail below.

Apparatus 11 may optionally include a variety of other components that facilitate providing tactile feedback to a user's fingertip. For example, and as shown in FIG. 4, apparatus 11 may include support structure 12 that supports and holds one or more of tactile feedback mechanism 13, position tracking element 14, and communication component 15, as described in connection with FIG. 1.

Some virtual reality environments may be augmented with physical objects to enhance a user's experience. For example, users wearing virtual reality headsets and gloves equipped with tactile feedback devices may move through a physical maze as part of a virtual reality experience. In other words, users may be able to touch, push, pull, or otherwise interact with physical objects as part of interacting with a virtual reality environment. A control system for a virtual reality environment that incorporates physical objects may benefit from information describing the nature of a user's interaction with physical objects. Accordingly, apparatus 11 may also include at least one capacitive pressure sensor that enables the control device to determine when the user's fingertip has come into contact with a physical surface. A capacitive pressure sensor may be coupled to support structure 12 such that the capacitive pressure sensor will detect when the user presses their fingertip against a solid surface. In other words, the capacitive pressure sensor may be held in place by support structure 12 such that it is held between the pad and/or tip of the user's fingertip and any surfaces that they may press against. Capacitive pressure sensors incorporated into apparatus 11 may communicate with a control device via communication component 15. Furthermore, as capacitive pressure sensors may require a source of electrical power, any capacitive pressure sensors incorporated into apparatus 11 may receive electrical power from an internal power source or a hard-wired source of electrical power, as will be described further below.

Figure 4:
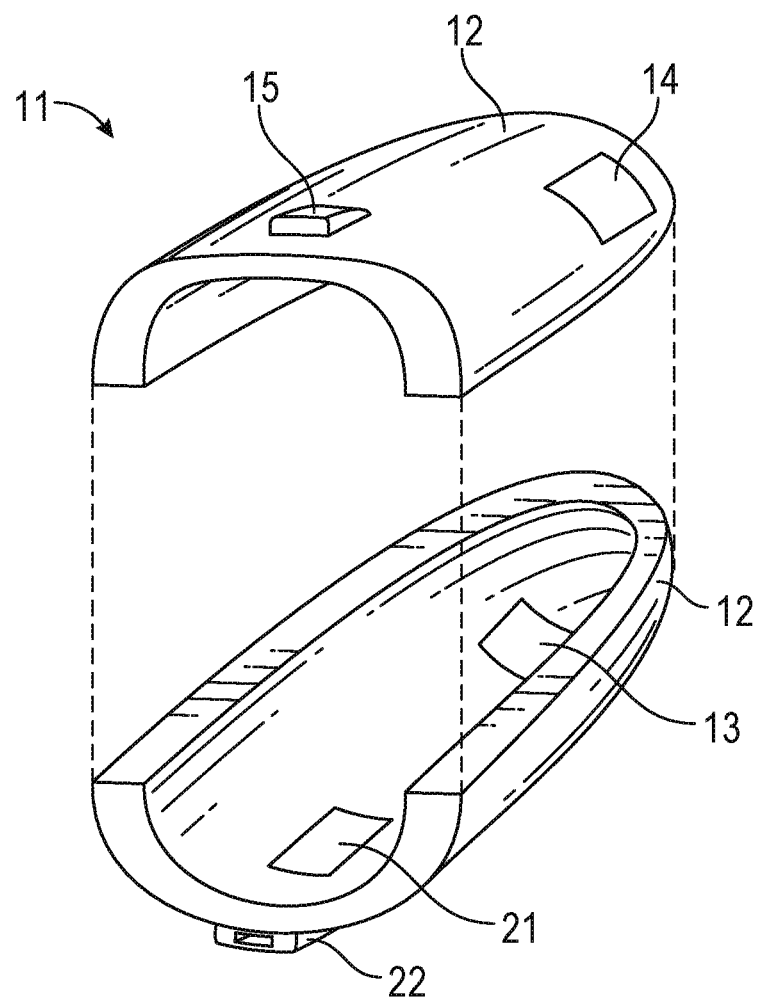
FIG. 4 is a cutaway diagram of an example apparatus for providing localized tactile feedback that incorporates an internal power supply.

In the example of FIG. 4, apparatus 11 also includes an internal power source 21. In general, internal power source 21 may serve as a source of electrical power to any mechanisms, components, and/or elements of apparatus 11 that require a source of electrical power to function. For example, internal power source 21 may be coupled to tactile feedback mechanism 13 and/or communication component 15 so that internal power source 21 may serve as a source of electrical power to those components. In embodiments where position tracking element 14 requires electrical power (such as an IMU), internal power source 21 may also be coupled to position tracking element 14. Furthermore, internal power source 21 may provide electrical power to any other components of apparatus 11 that require electrical power, such as the capacitive pressure sensor described above.

A user may charge internal power source through a charging component 22 that is incorporated into apparatus 11. Charging component 22 may be coupled to internal power source 21 to facilitate charging internal power source 21. Charging component 22 may receive electrical power to supply to internal power source 21 in a variety of ways. In some embodiments, charging component 22 may include an inductive charging or wireless charging component that utilizes electromagnetic induction to transfer power between a charging station and charging component 22. Additionally or alternatively, charging component 22 may include a socket for a wired connection to a source of electrical power, such as a wall-mounted electrical outlet. This socket may be dimensioned to receive a connector that adheres to any suitable interface standard for transferring electrical power, such as the IEEE 1394 ("Firewire") standard, a UNIVERSAL SERIAL BUS (USB) connector, a proprietary connection interface, and/or any other suitable interface for transferring electrical power.

Figure 5:
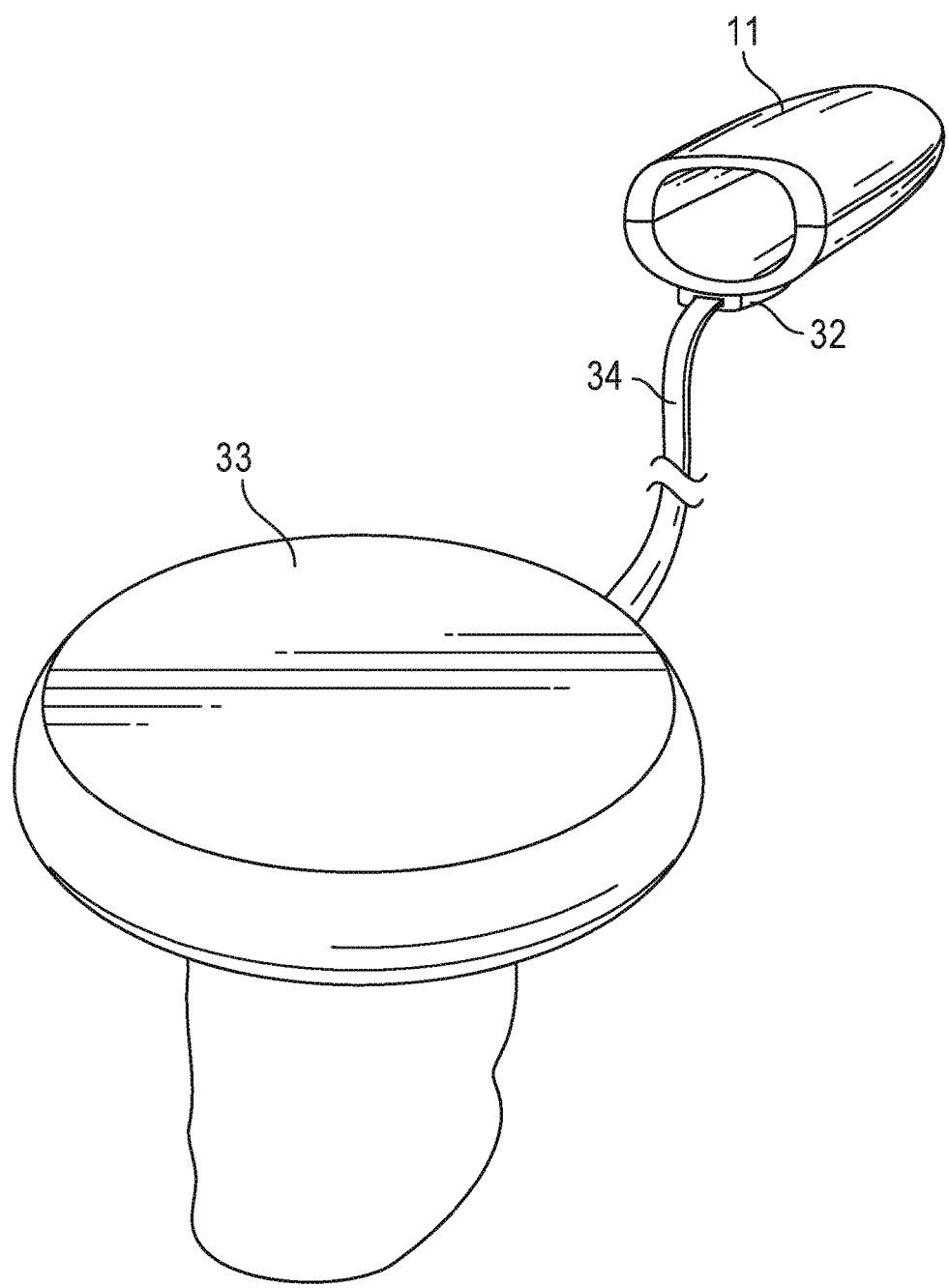
FIG. 5 is a schematic diagram of an example apparatus for providing localized tactile feedback at a location that is connected, via a cable, to a handheld controller.

Additionally or alternatively, apparatus 11 may include a cable that connects to another device, such as a handheld controller and/or a control device (e.g., a game console). For example, and as illustrated in FIG. 5, a cable 34 may connect apparatus 11 to a handheld controller 33 via a wired connection component 32. Cable 34 and/or wired connection component 32 may conform to any of the above-described interface standards or any other suitable interface standard. For example, wired connection component 32 may include a socket, such as the socket described above in connection with charging component 22, dimensioned to receive a plug or other connector appropriate to the interface standard utilized by wired connection component 32. Furthermore, cable 34 may directly connect apparatus 11 to the other device, or the cable may include a plug or other interface at the end of the cable distal from apparatus 11. As with cable 34 and wired connection component 32, this plug or other interface on the distal end of the cable may conform to any suitable interface standard.

Regardless of the manner of the connection formed between apparatus 11 and handheld controller 33, cable 23 and wired connection component 32 may facilitate the transfer of electrical power and/or data between apparatus 11 and handheld controller 33. For example, wired connection component 32 may enable communication component 15 and/or charging component 22 to use the same physical cable and/or connector for both data and power transfer. As a specific example, USB and Firewire interfaces allow for both data transfer and for power transfer through the same connection cable and/or socket.

Figure 6:
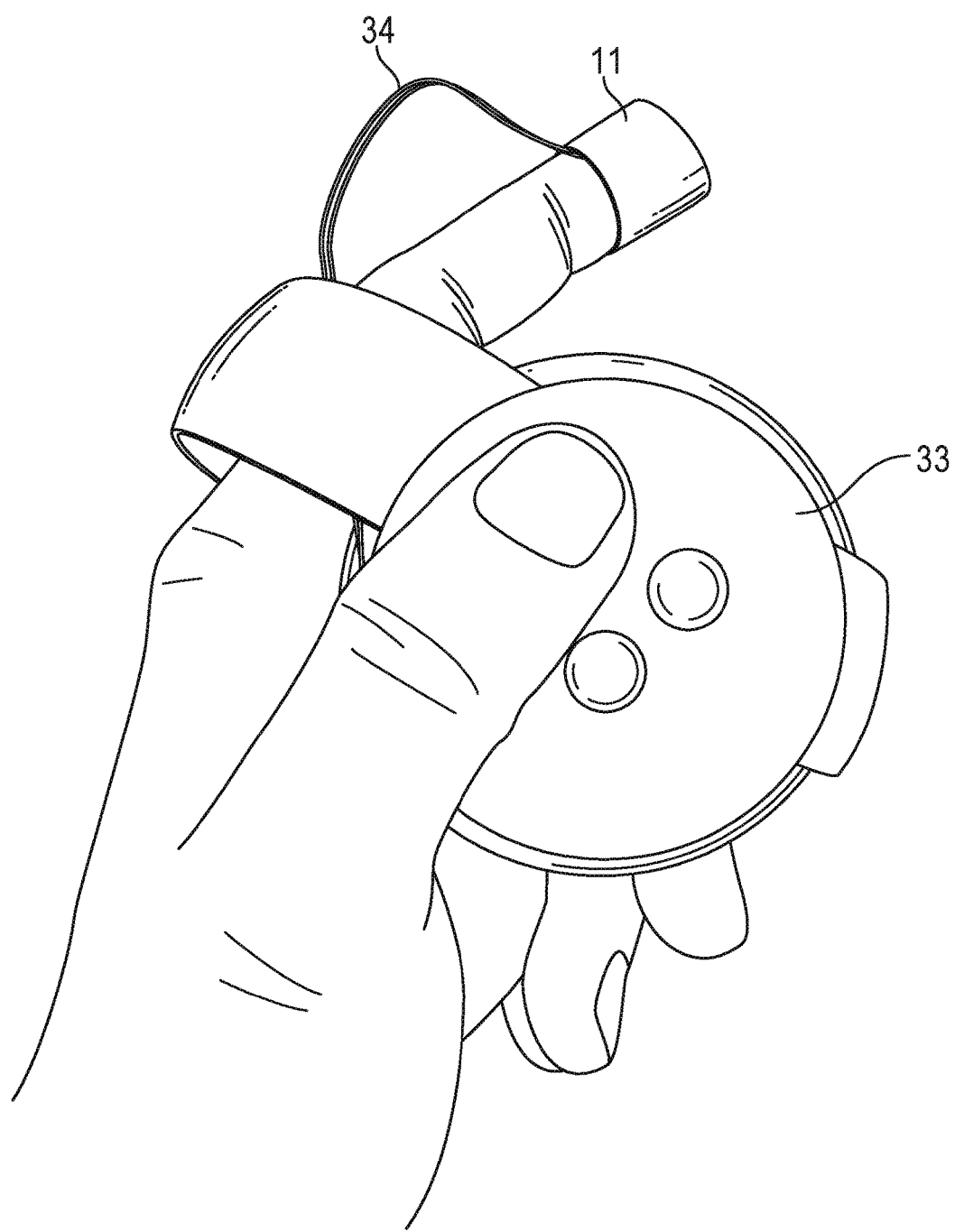
FIG. 6 is an additional schematic diagram of an example apparatus for providing localized tactile feedback at a location that is connected, via a cable, to a handheld controller.

FIG. 6 is an additional view of apparatus 11 connected to handheld controller 33 via cable 34. As shown in FIG. 6, a user may grasp handheld controller 33 in their hand. However, when the user extends their index finger, the tip of their finger may no longer be in contact with handheld controller 33 and therefore be unable to receive tactile feedback to their fingertip through handheld controller 33. While traditional feedback systems may not be able to provide feedback to a finger that is no longer in contact with a controller, the system illustrated in FIG. 6 may enable a user to continue receiving tactile feedback to their fingertip (via apparatus 11), thus allowing the user to interact with virtual objects in a more natural and intuitive manner than might be accomplished by systems that only provide tactile feedback through a handheld controller or similar device.

Although the examples of FIGS. 5 and 6 describe connecting apparatus 11 to a handheld controller, apparatus 11 may be connected via cable 34 to any other suitable device, such as an auxiliary power supply, external communications device, and the like.

Multiple instances of apparatus 11 may be used in conjunction to form a system by which a user may receive tactile feedback. In general, such a system may include several instances of apparatus 11, as described above. Each instance of apparatus 11 may communicate with a control device that manages and coordinates feedback across all relevant instances of apparatus 11 through the communication component of each instance of apparatus 11. As described above, the control device may determine, based on the position of each apparatus 11 in three-dimensional space, when to trigger the feedback mechanism of each apparatus 11.

Figure 7:
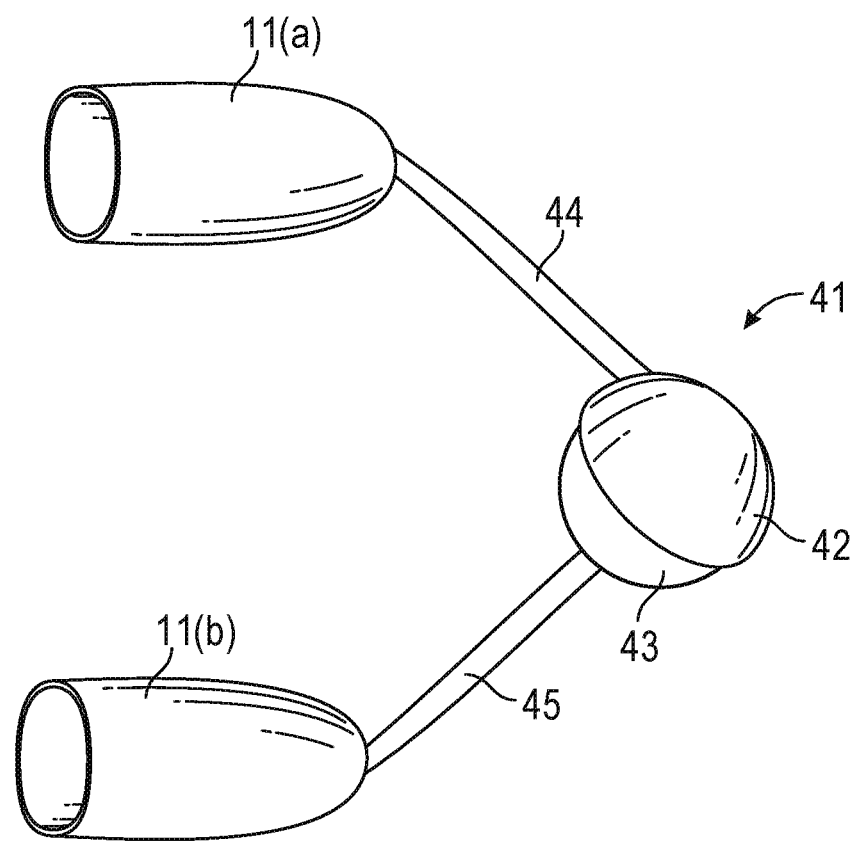
FIG. 7 is a schematic diagram of an example system in which two apparatuses for providing localized tactile feedback are connected to a ball-and-socket joint.

In some embodiments of the above-described system, each instance of apparatus 11 may be mechanically coupled to at least one other instance of apparatus 11 such that each coupled instance of apparatus 11 is able to move about a central joint. In some examples, this joint may be a ball-and-socket joint. As illustrated in FIG. 7, such a system may include two or more instances of apparatus 11 connected to a ball-and-socket joint 41, illustrated as apparatuses 11(a) and 11(b). Apparatus 11(a) may be connected to a socket 42 of ball-and-socket joint 41 by a first connector 44, while apparatus 11(b) may be connected to a ball 43 of ball-and-socket joint 41 by a second connector 45. This arrangement may enable apparatuses 11(a) and 11(b), and thus the user's fingertips, to move freely through three-dimensional space while providing support structures for additional sensors and/or feedback components, as will be described below. Ball-and-socket joint 41, first connector 44, and second connector 45 may be composed of any suitable material, such as plastics, resins, etc. In some embodiments, first connector 44 and second connector 45 may be composed of rigid materials to ensure that moving apparatus 11(a) relative to apparatus 11(b) causes socket 42 and ball 43 to swivel relative to each other. In further embodiments, some or all of first connector 44, second connector 45, and/or ball-and-socket joint 41 may be composed of flexible materials such as rubber or coil springs to maximize the freedom with which a user is able to manipulate apparatus 11(a) and 11(b).

Moreover, the points at which apparatus 11(a) connects to first connector 44 and at which apparatus 11(b) connects to second connector 45 may be able to flex to ensure that a user is able to move their fingertips freely through three-dimensional space. For example, the point at which an instance of apparatus 11 connects to its corresponding connector may be supported by a small hinge, an additional ball-and-socket joint, flexible material such as rubber or a coiled spring, or any other suitable mechanism for connecting two objects.

Figure 8:
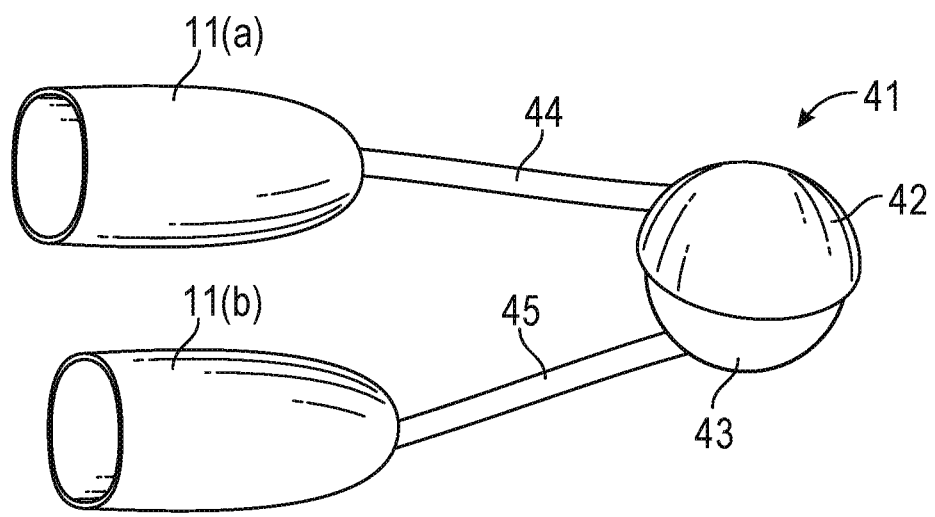
FIG. 8 is a diagram of the example system of FIG. 7 where the example apparatuses have been moved about the ball-and-socket joint.

FIG. 8 illustrates an example of how apparatus 11(a) and apparatus 11(b) may be repositioned relative to each other about ball-and-socket joint 41. As shown in FIG. 8, a user has brought apparatuses 11(a) and 11(b) closer together. This movement may, for example, represent pinching a virtual object. Moving apparatuses 11(a) and 11(b) relative to each other has caused the angle between first connector 44 and second connector 45 to change, thus causing a corresponding change in the relative positions of socket 42 and ball 43.

In some embodiments, ball-and-socket joint 41 may contain various sensors, actuators, motors, and/or other mechanisms that act on ball-and-socket joint 41 to record this movement and/or provide tactile feedback to the user through altering the flexibility and/or position of ball-and-socket joint 41. For example, ball-and-socket joint 41 may include joint position sensors that provide joint position data that describes the position of the central joint to the control device. The control device may use this position information either alone or in conjunction with position tracking element 14 (not illustrated in FIG. 8) as part of determining the location of the user's fingertips in three-dimensional space.

Ball-and-socket joint 41 may additionally or alternatively include a force feedback mechanism that is able to dynamically adjust the flexibility of ball-and-socket joint 41 in response to instructions received from the control device. In this manner, ball-and-socket joint 41 may be able to provide tactile feedback to simulate viscous materials, solid objects, etc. that a user of a virtual reality interface may interact with. As a specific example, a user may move their fingers to pinch a virtual object. This motion may cause socket 42 to swivel about ball 43 as the relative positions of apparatuses 11(a) and 11(b) change. The control device may receive information from sensors positioned throughout the system to determine that the user has interacted with the virtual object and prompt ball-and-socket joint 41 to resist further movement, thus providing tactile feedback to the user simulating contact with a solid surface. Similarly, ball-and-socket joint 41 may optionally include at least one positioning adjustment device that is able to mechanically adjust the position of ball-and-socket joint 41. Such a positioning adjustment device may reposition socket 42 and ball 43 relative to each other, thereby simulating an object pushing apparatus 11(a) away from apparatus 11(b). As a specific example, repositioning socket 42 and ball 43 relative to each other in this manner may simulate an inflating object such as a balloon.

Figure 9:
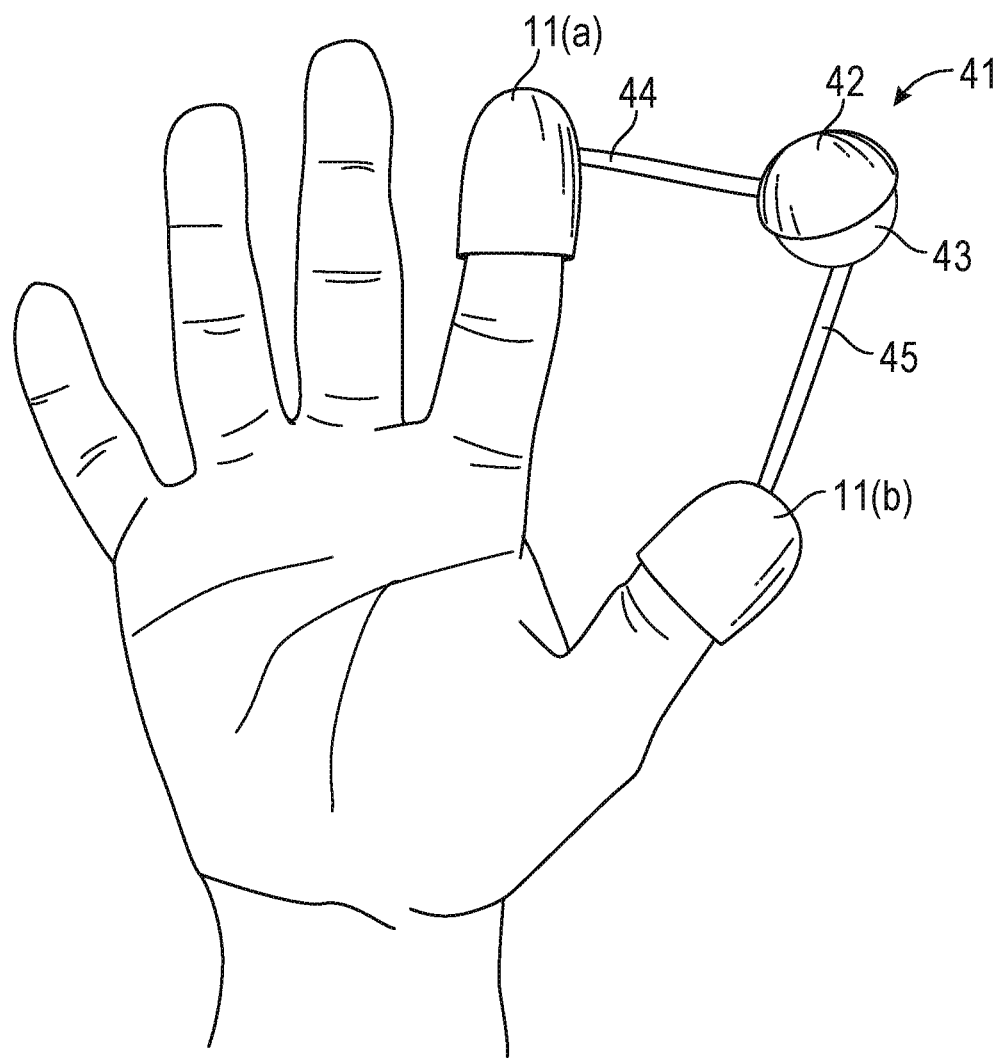
FIG. 9 is a diagram of the example system of FIG. 7 as it might be worn on a user's hand.

As described above, a user may wear instances of apparatus 11 on their fingers. FIG. 9 is an illustration of an example in which a user is wearing the system described in connection with FIGS. 7 and 8. As shown in FIG. 9, the user is wearing apparatus 11(a) on their index finger, and wearing apparatus 11(b) on their thumb. As described above, these instances of apparatus 11 are connected to ball-and-socket joint 41 through physical connectors. In this example, apparatus 11(b) is connected to ball 43 by second connector 45 while apparatus 11(a) is connected to socket 42 by first connector 44. As the user moves their thumb and forefinger through three-dimensional space, the angle between first connector 44 and second connector 45 may change, thus causing socket 42 and ball 43 to rotate relative to each other.

Figure 10:
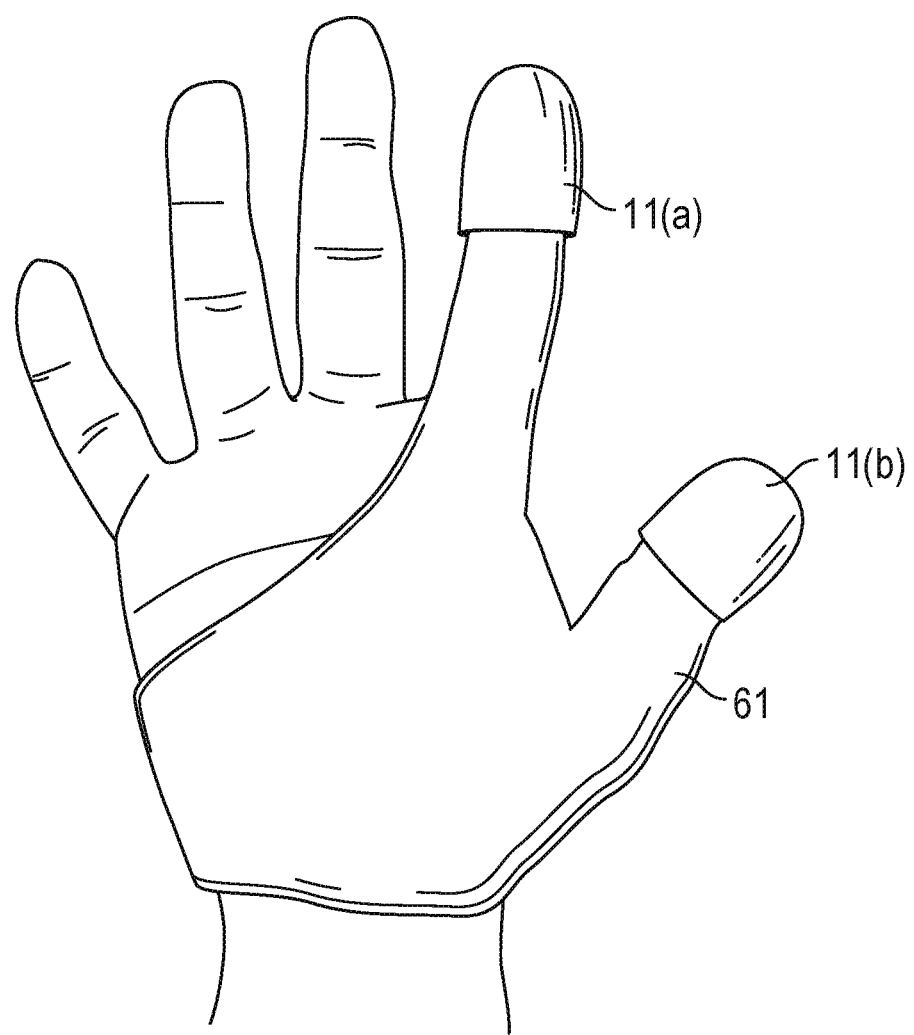
FIG. 10 is a schematic diagram of a partial glove being worn on a user's hand and that incorporates multiple apparatuses for providing localized tactile feedback.

In some embodiments, instances of apparatus 11 may be mounted in a glove or partial glove that fits over the user's hand and holds each instance of apparatus 11 in contact with a corresponding fingertip on the user's hand. For example, and as illustrated in FIG. 10, two instances of apparatus 11 may be held over a user's fingers by a partial glove 61. Specifically, apparatus 11(*a*) is held over the user's index finger, and apparatus 11(*b*) is held over the user's thumb. Partial glove 61 may allow the user's fingers to move freely while also holding the instances of apparatus 11 in proper position to provide tactile feedback to the user's fingertips. Although not illustrated here, the instances of apparatus 11 may optionally be physically connected to a joint, such as the ball-and-socket joint system illustrated in FIGS. 7-9, in addition to being mounted on partial glove 61.

In some of the above-described embodiments, a control device may manage tactile feedback to several of the user's fingertips through corresponding instances of apparatus 11. In these embodiments, the control device may register each instance of apparatus 11 to a corresponding fingertip on the user's hand. In the example of FIG. 10, the control device may register apparatus 11(*a*) to the index finger of the user's hand. Likewise, the control device may register apparatus 11(*b*) to the thumb of the user's hand. By registering instances of apparatus 11 in this way, the control device may ensure that each fingertip receives appropriate tactile feedback. For example, a user poking a virtual button might only receive tactile feedback on their index finger (i.e., the only fingertip that interacted with the virtual button) through an instance of apparatus 11 registered to that finger, while a user that pinches a virtual cube may receive tactile feedback through instances of apparatus 11 registered to their index finger and thumb, as both those fingertips interacted with the virtual object.

Although the examples of FIG. 9 and FIG. 10 only illustrate two instances of apparatus 11 worn on the user's thumb and index finger, various embodiments may include varying quantities of apparatus 11. For example, a user might wear a tactile interface that incorporates an instance of apparatus 11 for each finger on each hand for a total of ten instances of apparatus 11 in the system. These instances of apparatus 11 may coordinate through a control device, be physically connected in pairs in a manner similar to that illustrated in FIG. 9, be mounted on gloves that hold each instance of apparatus 11 in position over a fingertip, and so on.

Figure 11:
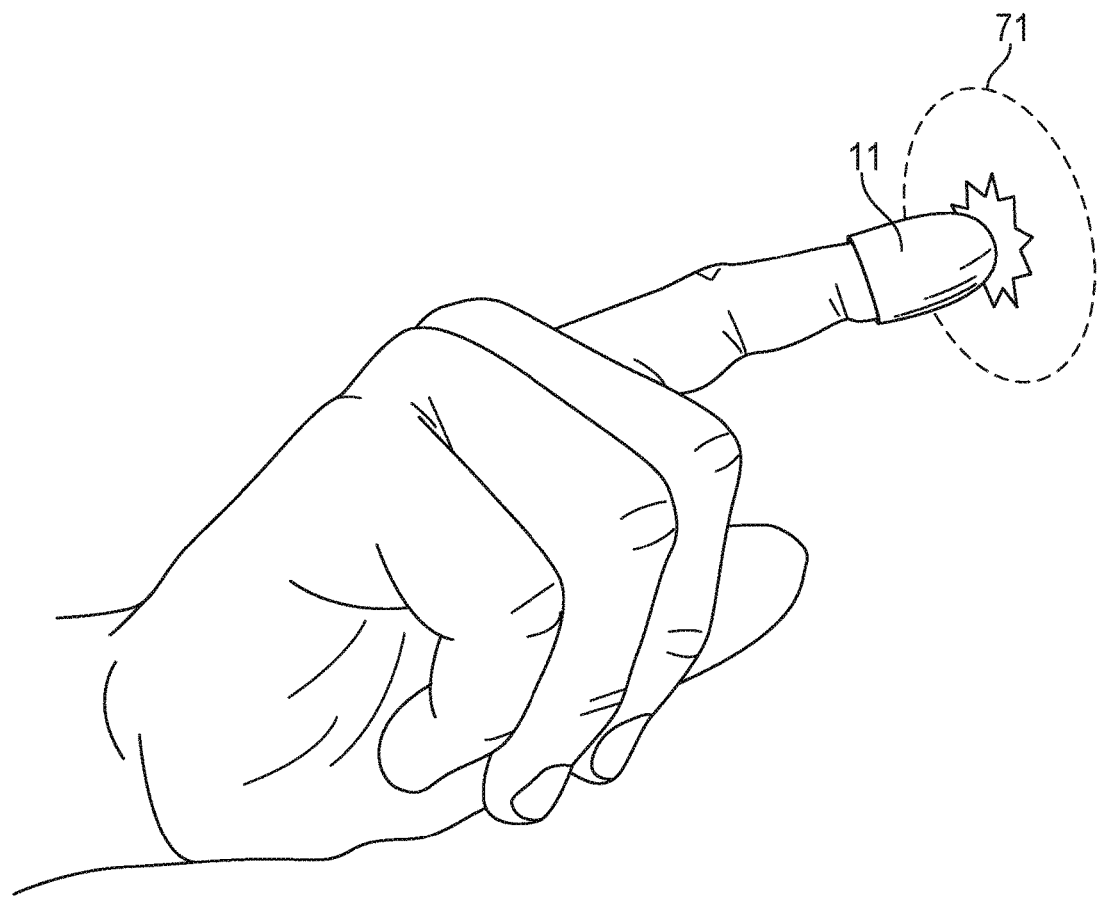
FIG. 11 is a schematic diagram of a user wearing an apparatus for providing localized tactile feedback and using the apparatus to interact with a virtual object.

As described above, a user may interact with a virtual object and receive tactile feedback through an instance of apparatus 11. As illustrated in FIG. 11, a user wearing an instance of apparatus 11 on their index finger may poke a virtual object 71. Virtual object 71 generally represents any shape, button, interface, or other object displayed and/or presented as part of a virtual reality interface. In examples where the virtual reality system includes physical objects, virtual object 71 may represent a physical object that is also presented, for example, within a virtual environment through a headset worn by the user. A control device may determine that the user has interacted with virtual object 71 by tracking the position in three-dimensional space of position tracking element 14 incorporated into apparatus 11. Upon detecting that the location of apparatus 11 (and, by extension, the user's fingertip) has interacted with virtual object 71, the control device may trigger tactile feedback mechanism 13 of apparatus 11, thereby providing the user with a physical representation of their interaction with virtual object 71. In embodiments where the control device registers instances of apparatus 11 to particular fingers of the user's hand, the control device may use this registration information as part of determining which instance of apparatus 11 to trigger when the user interacts with virtual object 71.

Although the above-described example illustrates a user poking a virtual button, users may interact with virtual objects in a variety of ways. For example, a user may push, pull, twist, and/or turn a virtual object. Different actions and/or interactions with virtual objects may result in different types, patterns, and/or intensities of tactile feedback, as will be described below.

Figure 12:
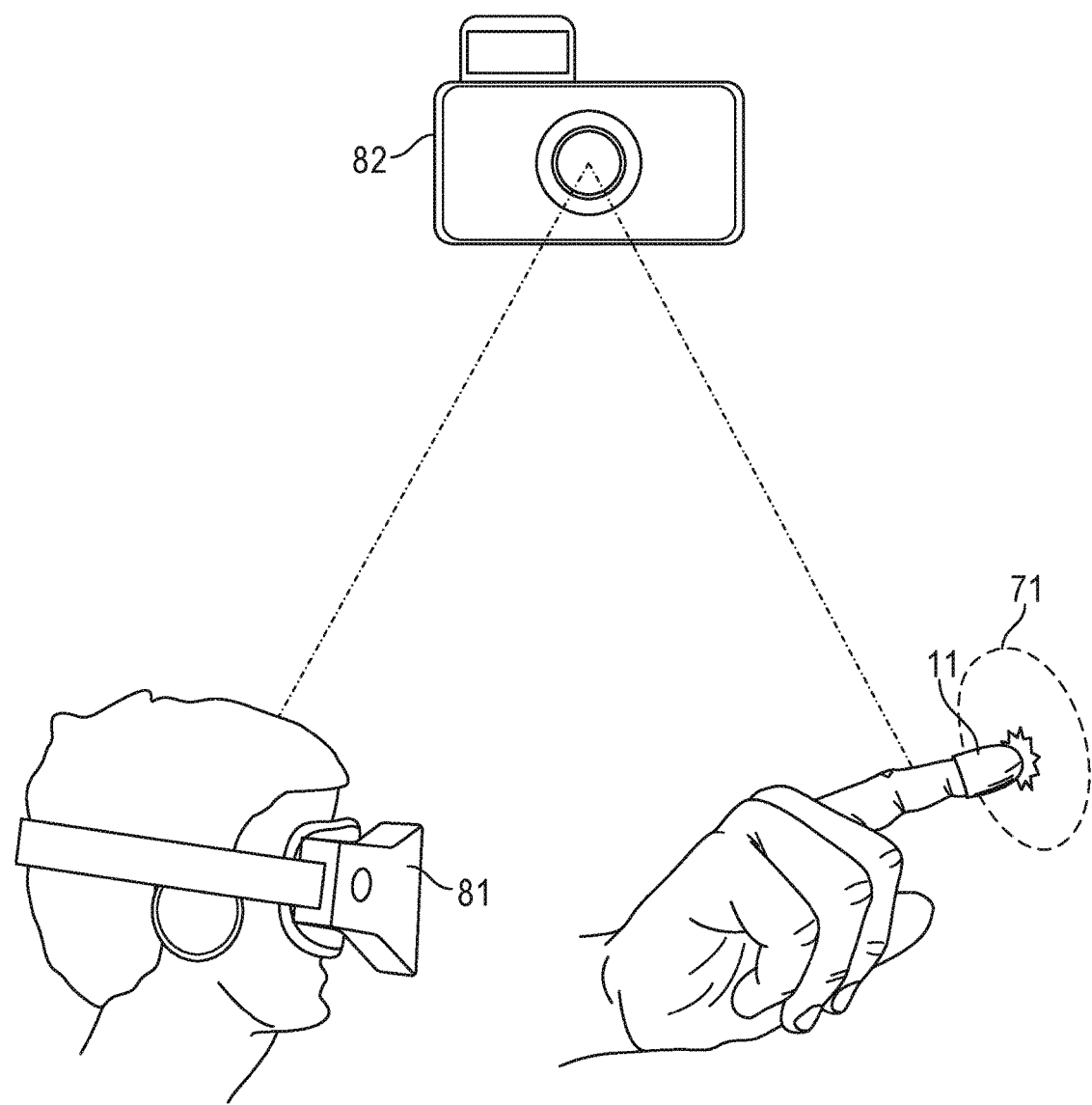
FIG. 12 is a schematic diagram of a user engaging with a virtual reality environment while wearing a headset that provides a visual representation of the virtual reality environment. The user is also wearing an apparatus for providing localized tactile feedback, and being observed by a camera.

An example system for presenting a user with a virtual reality interface is illustrated in FIG. 12. As shown in FIG. 12, such a system may include a headset 81 that provides the user with visual and/or audio feedback about the virtual environment. A camera 82 may track the movement of the user through three-dimensional space either directly or through various position tracking elements incorporated into apparatus 11, as described above, and/or headset 81. The user may then reach out to interact with virtual object 71. Camera 82 may track the movement of the user's finger and/or the movement of apparatus 11 (e.g., through passive position tracking elements). A control device that manages the virtual environment may be communicatively coupled to headset 81 and camera 82 (e.g., by physical wires, through a wireless network, and/or by radio communications) receive telemetry information from camera 82 and/or apparatus 11 describing the movement and determine that the position of the user's finger in three-dimensional space corresponds to the user touching virtual object 71. The control device may then trigger tactile feedback mechanism 13 of apparatus 11 to provide tactile feedback to the user's index finger.

Figure 13:
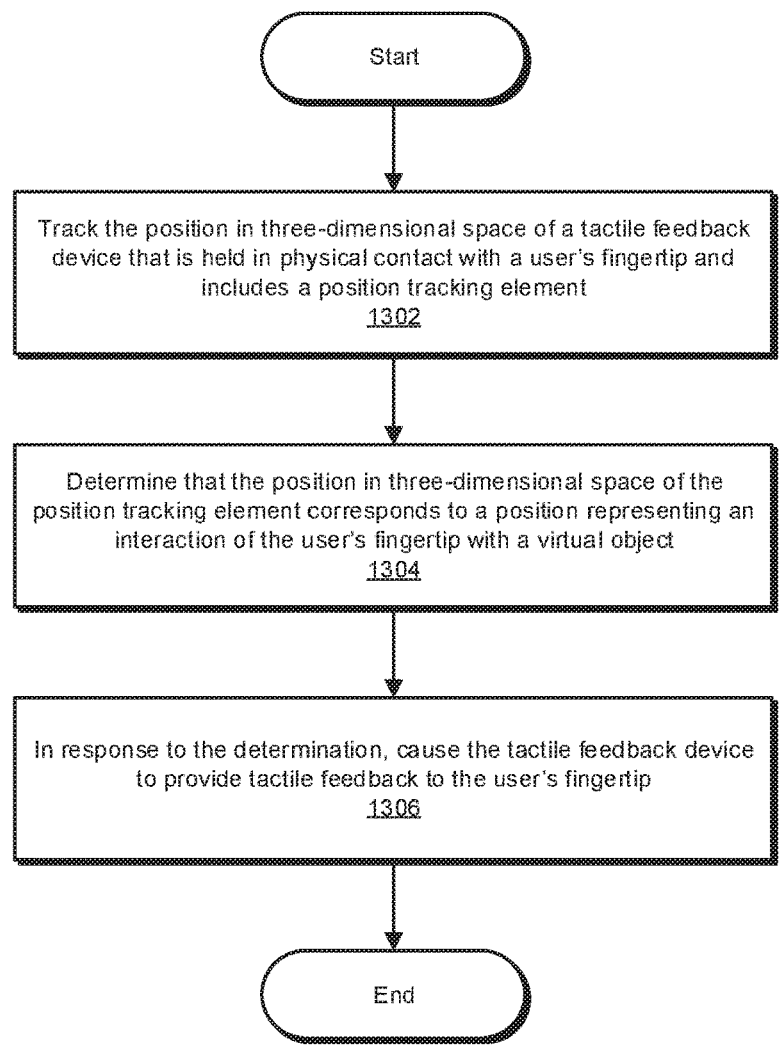
FIG. 13 is a flow diagram illustrating an example method for providing localized tactile feedback through a purpose-built apparatus.

The above-described apparatuses and systems may use a specific method for determining when and/or how to provide tactile feedback to a user's fingertip. An example method 1300 is illustrated in FIG. 13. At step 1302 of method 1300, method 1300 may include tracking the position in three-dimensional space of a tactile feedback device, such as apparatus 11 as described above. The tactile feedback device may be held in physical contact with a user's fingertip and include a position tracking element, such as position tracking element 14 of apparatus 11. This tracking may be accomplished in a variety of ways, such as by receiving telemetry data from active tracking elements incorporated into the tactile feedback device and/or by receiving telemetry data from cameras and/or other sensors that track passive position tracking elements incorporated into the tactile feedback device.

Returning to FIG. 13 at step 1304, method 1300 may include determining that the position in three-dimensional space of the position tracking element corresponds to a position representing an interaction of the user's fingertip with a virtual object. For example, and with returning reference to FIG. 12, a user may reach out to poke virtual object 71, thereby causing apparatus 11 to move to a position representing the poke action. Apparatuses and systems implementing method 1300 may analyze tracking telemetry received from various devices that track the position of apparatus 11, e.g., apparatus 11 itself and/or camera 82, to determine that the position of apparatus 11 represents the user interacting with virtual object 71.

At step 1306, method 1300 may include, in response to the determination, causing the tactile feedback device to provide tactile feedback to the user's fingertip. For example, when a control system that manages and/or coordinates apparatus 11 with a virtual environment determines that the position of apparatus 11 corresponds to an interaction with a virtual object, the control system may trigger a tactile feedback mechanism incorporated into apparatus 11, thereby providing a user with a physical indication of the interaction with the virtual object.

As described above, some systems may track and coordinate tactile feedback across multiple tactile feedback devices. In these embodiments, method 1300 may include tracking the position in three-dimensional space of each additional tactile feedback device. As described above, each of these tactile feedback devices may be held in physical contact with a corresponding fingertip on the user's hand, and each tactile feedback device may include its own position tracking elements, tactile feedback mechanisms, etc. Systems implementing this method may then track the positions and/or movements of each tactile feedback device. Upon determining that a particular tactile feedback device has moved in such a way that indicates an interaction with a virtual object, these systems may cause the particular tactile feedback device to provide tactile feedback to the corresponding fingertip. For example, a user wearing the partial glove illustrated in FIG. 10 who pinches a virtual object with their thumb and forefinger may move each instance of apparatus 11 into a position representing pinching a virtual object (e.g., virtual object 71 in FIGS. 11 and 12). As an additional example, a user wearing the partial glove illustrated in FIG. 10 may twist a virtual door handle. A control system managing the virtual environment may detect this twisting motion and trigger apparatuses 11(a) and 11(b) to provide tactile feedback that represents twisting the door handle.

The systems and methods described herein may also adjust the tactile feedback provided to the user's fingertip based on a variety of factors. For example, a control system may adjust the tactile feedback provided by apparatus 11 by adjusting the pattern of the tactile feedback, the type of tactile feedback (e.g., vibrational versus electrical stimulation), and/or the intensity of the tactile feedback provided. For example, a particular pattern of vibration may indicate an interaction with a particular virtual button, while a different pattern of vibration may indicate an interaction with a different virtual button. As an additional example, the intensity of vibration provided through apparatus 11 may increase as the user's fingertip approaches a virtual object, such as a virtual heat source. As a further example, a user may experience a persistent vibrational feedback as they drag a virtual icon through a virtual space to represent their ongoing interaction with the virtual icon. Similarly, the type of tactile feedback provided may vary. For example, a control system may direct apparatus 11 to provide vibrational feedback for certain types of virtual interaction, but direct apparatus 11 to provide electrical stimulation feedback for other types of virtual interaction.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a plurality of tactile feedback devices, each tactile feedback device comprising:
      a support structure that permits a user's fingertip to move freely in three-dimensional space while holding at least a portion of the tactile feedback device in physical contact with the user's fingertip;
      at least one feedback mechanism, coupled to the support structure, that provides tactile feedback to the user's fingertip through the portion of the tactile feedback device that is in physical contact with the user's fingertip;
      at least one position tracking element that facilitates tracking the position of the user's fingertip in three-dimensional space; and
      a communication component that facilitates communication between the tactile feedback device and other computing devices;
   a plurality of mechanical joints, wherein each mechanical joint is mechanically coupled to a pair of tactile feedback devices in the plurality of tactile feedback devices such that each pair of tactile feedback devices is able to move about the central mechanical joint; and
   a control device that:
      communicates with each tactile feedback device in the plurality of tactile feedback devices via the communication component of each tactile feedback device; and
      determines, based on the position of each tactile feedback device in three-dimensional space, when to trigger the feedback mechanism of each tactile feedback device.

2. The system of claim 1, wherein the central joint comprises a ball-and-socket joint.

3. The system of claim 1, further comprising joint position sensors that provide joint position data that describes the position of the central joint to the control device.

4. The system of claim 1, wherein the central joint comprises a force feedback mechanism that is able to dynamically adjust the flexibility of the central joint based on instructions from the control device.

5. The system of claim 1, wherein the central joint comprises at least one positioning adjustment device that is able to mechanically adjust the position of the central joint.

6. The system of claim 1, further comprising a glove that that fits over the user's hand and holds each tactile feedback device in contact with a corresponding fingertip on the user's hand.

7. The system of claim 1, wherein each tactile feedback device in the plurality of tactile feedback devices is registered, at the control device, to a corresponding fingertip on the user's hand.

8. The system of claim 1, wherein the feedback mechanism comprises a vibrational feedback mechanism.

9. The system of claim 1, wherein the feedback mechanism comprises a transcutaneous electrical nerve stimulation feedback mechanism.

10. The system of claim 1, wherein the position tracking element comprises a passive tracking element that enables the control device to track, by an additional tracking system that provides the control device with tracking information that describes the position of the user's fingertip in three-dimensional space, the position of the user's fingertip in three-dimensional space.

11. The system of claim 1, wherein the position tracking element comprises an active tracking mechanism that generates position tracking data based on the movement of the user's fingertip through three-dimensional space and provides the position tracking data to the control device.

12. The system of claim 1, wherein the support structure comprises a glove that fits over at least two of the user's fingertips.

13. The system of claim 1, wherein the communication component comprises a wireless communication device.

14. The system of claim 1, further comprising an internal power supply, coupled to the feedback mechanism of each tactile feedback device and the communication component of each tactile feedback device, that serves as a source of electrical power.

15. The system of claim 1, wherein each tactile feedback device comprises at least one capacitive pressure sensor that enables the control device to determine when the user's fingertip has come into contact with a physical surface.

* * * * *

UNITED STATES PATENT AND TRADEMARK OFFICE
CERTIFICATE OF CORRECTION

PATENT NO. : 10,409,375 B1
APPLICATION NO. : 15/644680
DATED : September 10, 2019
INVENTOR(S) : Jason Andrew Higgins et al.

Page 1 of 1

It is certified that error appears in the above-identified patent and that said Letters Patent is hereby corrected as shown below:

In the Claims

In Column 15, Lines 6-7, Claim 6, delete "that that" and insert -- that --, therefor.

Signed and Sealed this
Twelfth Day of November, 2019

Andrei Iancu
*Director of the United States Patent and Trademark Office*